United States Patent
Kopp

(10) Patent No.: US 11,345,279 B2
(45) Date of Patent: May 31, 2022

(54) DEVICE AND METHOD FOR WARNING A DRIVER OF A VEHICLE

(71) Applicant: Robert Bosch GmbH, Stuttgart (DE)

(72) Inventor: Michael Kopp, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/273,633

(22) PCT Filed: Sep. 18, 2019

(86) PCT No.: PCT/EP2019/075083
§ 371 (c)(1),
(2) Date: Mar. 4, 2021

(87) PCT Pub. No.: WO2020/104083
PCT Pub. Date: May 28, 2020

(65) Prior Publication Data
US 2021/0316660 A1     Oct. 14, 2021

(30) Foreign Application Priority Data

Nov. 22, 2018   (DE) .......................... 102018219976.0

(51) Int. Cl.
*B60Q 9/00*          (2006.01)
*G01S 17/931*        (2020.01)
(Continued)

(52) U.S. Cl.
CPC .............. *B60Q 9/008* (2013.01); *G01S 13/04* (2013.01); *G01S 13/931* (2013.01); *G01S 15/04* (2013.01);
(Continued)

(58) Field of Classification Search
CPC .... G08G 1/081; G08G 1/0116; G08G 1/0133; G08G 1/0141; G08G 1/0145; G08G 1/08;
(Continued)

(56) References Cited

U.S. PATENT DOCUMENTS

| 2007/0244641 | A1* | 10/2007 | Altan | B60W 50/16 701/300 |
| 2013/0009789 | A1* | 1/2013 | Ichikawa | G08G 1/167 340/904 |
| 2016/0090037 | A1 | 3/2016 | Tetsuka et al. | |

FOREIGN PATENT DOCUMENTS

| DE | 102014226744 A1 | 6/2016 |
| ER | 2626268 A2 | 8/2013 |

(Continued)

OTHER PUBLICATIONS

International Search Report for PCT/EP2019/075083, dated Jan. 13, 2020.

*Primary Examiner* — Daryl C Pope
(74) *Attorney, Agent, or Firm* — Norton Rose Fulbright US LLP; Gerard A. Messina

(57) ABSTRACT

A device and a method for warning a driver of a vehicle. The vehicle includes one or multiple surroundings sensor(s) that detect objects in the vehicle surroundings, and an evaluation device is provided in which a surroundings model is created from the object detections by the one or multiple surroundings sensor(s). Also provided is an actuator system that informs the driver of recognized objects of the surroundings model, in that the actuator system for informing the driver contains a piece of spatial warning information, and the driver is haptically informed of the position of the object.

10 Claims, 2 Drawing Sheets

(51) Int. Cl.
    *G01S 17/04*         (2020.01)
    *G01S 13/04*         (2006.01)
    *G01S 13/931*       (2020.01)
    *G01S 15/04*         (2006.01)
    *G01S 15/931*       (2020.01)
    *G08G 1/16*          (2006.01)

(52) U.S. Cl.
    CPC ............ *G01S 15/931* (2013.01); *G01S 17/04* (2020.01); *G01S 17/931* (2020.01); *G08G 1/166* (2013.01); *G01S 2013/9316* (2020.01)

(58) Field of Classification Search
    CPC ............. G08G 1/087; G08G 1/096708; G08G 1/096741; G08G 1/096783; G08G 1/096725; G06F 17/11
    See application file for complete search history.

(56) References Cited

FOREIGN PATENT DOCUMENTS

| | | | |
|---|---|---|---|
| GB | 2512317 | A | 10/2014 |
| WO | 2007042355 | A1 | 4/2007 |

\* cited by examiner

DEVICE AND METHOD FOR WARNING A DRIVER OF A VEHICLE

The present invention relates to a device and a method for warning a driver of a vehicle, the vehicle including one or multiple surroundings sensors that detect objects in the vehicle surroundings, and an evaluation device being provided in which a surroundings model is created from the object detections by the one or multiple surroundings sensors. Also provided is an actuator system that informs the driver of recognized objects of the surroundings model, in that the actuator system for informing the driver contains a piece of spatial warning information, and the driver is haptically informed of the position of the object.

BACKGROUND INFORMATION

A method for outputting a warning via a lane-keeping assistant for a vehicle is described in German Patent Application No. DE 10 2014 226 744 A1, in which a hazard level that is associated with a driving situation of the vehicle is read in, and an intensity of a warning signal for warning a driver of the vehicle is set in a further step as a function of the hazard level. The warning signal is generated with the intensity that is set in the step of setting.

SUMMARY

In accordance with the present invention, a device and an associated method are provided with which an actuator system for informing the driver may be provided which contains a piece of spatial warning information and haptically informs the driver of the position or the direction of the object.

According to the present invention, this is achieved by the features of example embodiments of the present invention. Advantageous refinements and embodiments result from the disclosure herein.

In accordance with an example embodiment of the present invention, it is advantageously provided that the evaluation device is configured to ascertain from the surroundings model relative positions and/or the spatial direction of the detected objects with respect to the vehicle. The relative position may be indicated within an X-Y coordinate system, for example, the coordinate origin being situated within the host vehicle. The spatial direction of the detected objects may be ascertained, for example, as the azimuth angle of the detected object with respect to the host vehicle longitudinal axis. The spatial direction may then be indicated with an angle value between 0° and 360°.

For creating the surroundings model, in addition to the object coordinates relative to the host vehicle or the object direction with respect to the host vehicle, it is alternatively or additionally possible to use further variables which may be selectively measured directly with the aid of the surroundings sensors or ascertained from measured variables that are already present. Thus, for example, the relative velocity of the objects may be selectively measured directly, or may be computed from the time derivative of the distance values of the objects with respect to the host vehicle. In addition to the relative velocity, it is alternatively or additionally possible to use further variables such as the object size, the object backscatter cross section, the object surface quality, or any other measurable value.

In addition, it is advantageous that the actuator system for informing the driver is made up of a plurality of vibration actuators in the driver's seat and/or in the steering wheel.

Furthermore, it may be advantageous that the actuator signals for informing the driver are designed in such a way that a plurality of vibration actuators in the driver's seat and/or in the steering wheel are individually activatable or deactivatable, and/or are variably activatable in their intensity and/or frequency. For example, multiple, for example 10 or 12, vibration actuators may be installed in the base area of the driver's seat, distributed on the left and right sides of the seat frame between the front end of the seat and the rear end of the seat. A piece of haptic direction information may thus be communicated to the driver sitting on the driver's seat by activating a vibration actuator or multiple adjacent vibration actuators.

As an alternative to the vibration actuators in the driver's seat and/or in the steering wheel or a combination of the vibration actuators in the driver's seat and/or in the steering wheel, it is also advantageous to provide vibration actuators in the accelerator pedal and/or in the brake pedal and/or in an armrest of the driver's seat and/or in the headrest of the driver's seat, which are likewise individually activatable, deactivatable, and/or changeable in their vibration frequency or activatable with a vibration pattern. It is thus possible to intuitively inform the driver of different driving situations, for example in that only the headrest is set in vibration or only the left or the right armrest of the driver's seat may be set in vibration. An activation of vibration actuators at multiple installation sites is also advantageously possible, for example to notify in a particularly urgent manner of a particularly critical driving situation.

Moreover, it is advantageous that the activation of the plurality of vibration actuators in the driver's seat and/or in the steering wheel takes place in such a way that, due to the activated actuators, a vibration of the seat or of the steering wheel is generated which haptically informs the driver of the direction, corresponding to the spatial position of the recognized object. If the vibration actuator in the seat or in the steering wheel is activated in the direction, or multiple adjacent actuators are activated in the direction, in which with respect to the vehicle longitudinal axis an object has been recognized in the vehicle surroundings, in addition to a specific surroundings situation it is also possible to intuitively communicate the direction information to the driver without the driver having to read off a visual display or wait for the end of an acoustic announcement, thus being distracted from the driving operation.

Furthermore, it is advantageous that the one or multiple surroundings sensor(s) is/are made up of one or multiple radar sensor(s), one or multiple ultrasonic sensor(s), one or multiple LIDAR sensor(s), one or multiple video sensor(s), or a combination thereof. A sufficient number of sensors are advantageously installed around the vehicle so that the vehicle surroundings are completely detected all around, or at least in an angular range of interest. Areas may be covered by different or identical types of sensors, or angular ranges may be covered by different sensors, in such a way that redundancy may be provided and a plausibility check of the object detection may be carried out.

As an alternative to the stated types of sensors or in combination therewith, a car-to-X interface may also be provided as a surroundings sensor. With the aid of such a car-to-X interface, data of sensors outside the vehicle may be received and processed the same as data that have been obtained by the sensors of the host vehicle. Thus, for example, surroundings sensors of other vehicles that are traveling in the vehicle surroundings may provide the data of their surroundings sensors via the car-to-X interface. For this purpose, a transfer may take place from vehicle to vehicle, or by the intermediate connection of a data transfer service these data may be transferred from the other vehicle to a data server, and transferred from the data server to the host vehicle in a further step. Additionally or alternatively, it is likewise possible to use data of surroundings sensors which are stationarily mounted at infrastructure facilities, and which, for example, monitor the shoulder of expressways or provide object data at road intersections. These data may likewise be transferred into the vehicle via the car-to-X interface.

In addition, it is also optionally possible to transfer data into the vehicle, via the car-to-X interface, that originate from a surroundings model and that have been ascertained in a data server by collecting object data in the surroundings of the host vehicle and combined into a traffic surroundings model. Such surroundings model data may likewise be used as input data for the function according to the present invention.

Furthermore, it is advantageous that the information to the driver about the direction of the objects is output to the vibration actuators when objects are newly recognized, when it is recognized that a moving object in the vehicle surroundings is passing the host vehicle, when it is recognized that a moving object in the vehicle surroundings is being passed by the host vehicle, when it is recognized that there is a hazard to the host vehicle due to a moving object in the vehicle surroundings, when a critical approach by a moving object toward the host vehicle is recognized, or a combination of these surroundings situations is recognized. In general, the driver is always to be informed of the direction of an object when the surroundings situation changes, or changes in such a way that it cannot be ensured that the driver has become aware of this changed surroundings situation.

Moreover, it is advantageous that for different surroundings situations, the actuators are activated with different frequencies and/or are activated with the aid of different vibration patterns. The different vibration patterns may be designed in such a way that sequences of switch-on signals and switch-off signals follow one another, similar to a binary code or Morse code, a variation in the intensity of the vibration takes place, or the vibration frequency of the actuator is controlled, for example as a function of the hazard or the size of the object. It is thus possible to intuitively inform the driver of different surroundings situations and to indicate the level of the hazard or the type of recognized object.

The method may be implemented, for example, in software or hardware or in a mixed form of software and hardware, for example in a control unit.

The present invention also provides a distance controller that is designed to carry out, control, or implement the steps of one variant of the method provided here in appropriate units.

In accordance with an example embodiment of the present invention, the distance controller may be an electrical device that includes at least one processing unit for processing signals or data, at least one memory unit for storing signals or data, and at least one interface and/or a communication interface for reading in or outputting data that are embedded in a communication protocol. The processing unit may be, for example, a signal processor, a so-called system ASIC, or a microcontroller for processing sensor signals and outputting data signals as a function of the sensor signals. The memory unit may be a flash memory, an EEPROM, or a magnetic memory unit, for example. The interface may be designed as a sensor interface for reading in the sensor signals of a sensor, and/or as an actuator interface for outputting the data signals and/or control signals to an actuator. The communication interface may be designed for reading in or outputting the data wirelessly and/or in a hard-wired manner. The interfaces may also be software modules that are present on a microcontroller, for example, in addition to other software modules.

Also advantageous in accordance with an example embodiment of the present invention is a computer program product or computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer, a programmable control unit, or a similar device.

It is pointed out that some of the possible features and advantages of the present invention are described herein with reference to different specific embodiments as a method for controlling a distance and as a distance controller. One skilled in the art will recognize that, in view of the disclosure herein, the features may be suitably combined, modified, or exchanged to arrive at further specific embodiments of the present invention.

BRIEF DESCRIPTION OF THE DRAWINGS

Exemplary embodiments of the present invention are explained below with reference to the figures.

DETAILED DESCRIPTION OF EXAMPLE EMBODIMENTS

Figure 1:
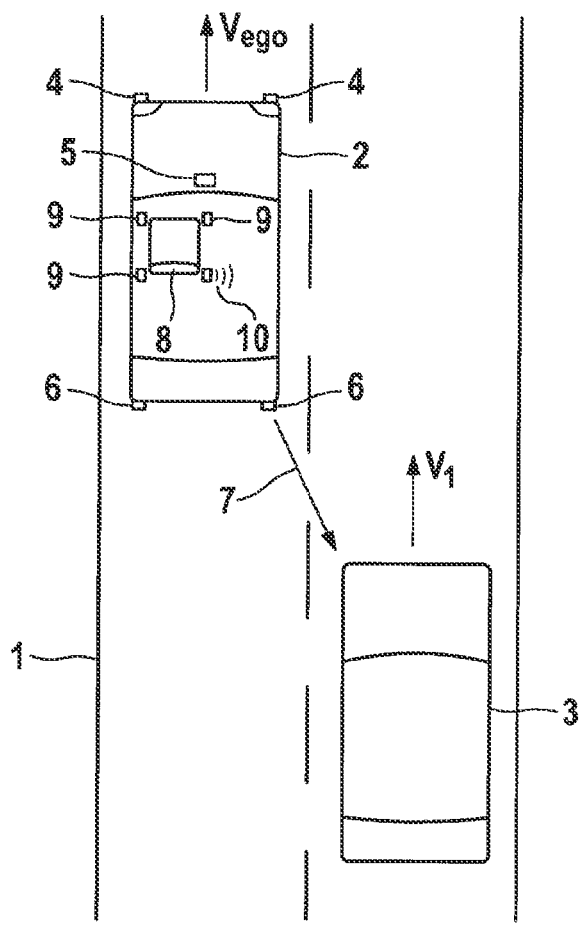
FIG. 1 shows a schematic top view onto a driving situation for explaining a device according to an example embodiment of the present invention and a method according to an example embodiment of the present invention.

FIG. 1 shows a top view onto a multilane road 1 on which host vehicle 2 is moving at velocity $V_{ego}$. Another vehicle 3, which is discerned as a surroundings object and is moving at velocity $V_1$, is traveling on the adjacent lane to the right. Host vehicle 2 is equipped with one or multiple surroundings sensors 4, 5, 6, for example in the illustrated specific embodiment, with two front sensors 4 at the left and right front corners of the vehicle, a further surroundings sensor 5, which may be designed as a video camera, for example, situated in the area of the windshield, and two rear sensors 6, respectively mounted at the left and right rear corners of the vehicle. With the aid of these surroundings sensors 4, 5, 6, the vehicle may monitor the entire surroundings area and recognize objects in the vehicle surroundings with regard to their distance and their relative velocity. The number and the configuration of the surroundings sensors may be varied, and are not limited to the exemplary embodiment illustrated. Sensors 4, 5, 6 may also be designed as different sensors, for example in such a way that one portion of the sensors is designed as radar sensors, and another portion is designed as LIDAR or ultrasonic sensors or in some other combination. Right rear sensor 6 detects approaching other vehicle 3, which is situated in the neighboring lane of multilane road 1 and traveling at a velocity $V_1$ that is greater than velocity $V_{ego}$ of host vehicle 2. Thus, other vehicle 3 approaches host vehicle 2, at a certain point in time is in the so-called blind spot of host vehicle 2, and in the future will presumably pass host vehicle 2. Right rear sensor 6 detects other vehicle 3 via object detection 7, and transmits this object information to an evaluation device 20, not illustrated in FIG. 1 for reasons of clarity. The relative position of other vehicle 3 with respect to host vehicle 2 or the azimuthal direction of other vehicle 3 with respect to the vehicle longitudinal axis of host vehicle 2 is ascertained, and signals for haptically warning the driver are generated, in this evaluation device 20. For this purpose, for example four vibration actuators 9, 10 are mounted at driver's seat 8 in host vehicle 2 in the area of the vehicle mounting. These vibration actuators 9, 10 are individually activatable and deactivatable, and may be activated with different frequencies, different vibration patterns, and individually. Since other vehicle 3 has been detected in the right rear area of host vehicle 2, right rear vibration actuator 10 is activated and the other three vibration actuators 9 remain inactive. As a result, the driver obtains the information, via the vibration at the right rear corner of vehicle seat 8, that a vehicle has been detected in the surroundings area to the right and behind host vehicle 2. In addition, it is possible for vibration patterns or a vibration frequency corresponding to the hazard due to the driving situation or due to the size or velocity of other vehicle 3 to provide the driver of host vehicle 2 with further pieces of information. The illustration of vehicle seat 8 with the aid of four vibration actuators 9, 10 is shown by way of example only. Thus, it is possible for a much greater number of vibration actuators, for example twelve or even more, to be installed at the vehicle seat, so that an even finer resolution of the warning direction is made possible, in that the appropriate vibration actuator at the vehicle seat is activated, or multiple adjacent, for example, vibration actuators 9, 10 at the vehicle seat are activated.

Figure 2:
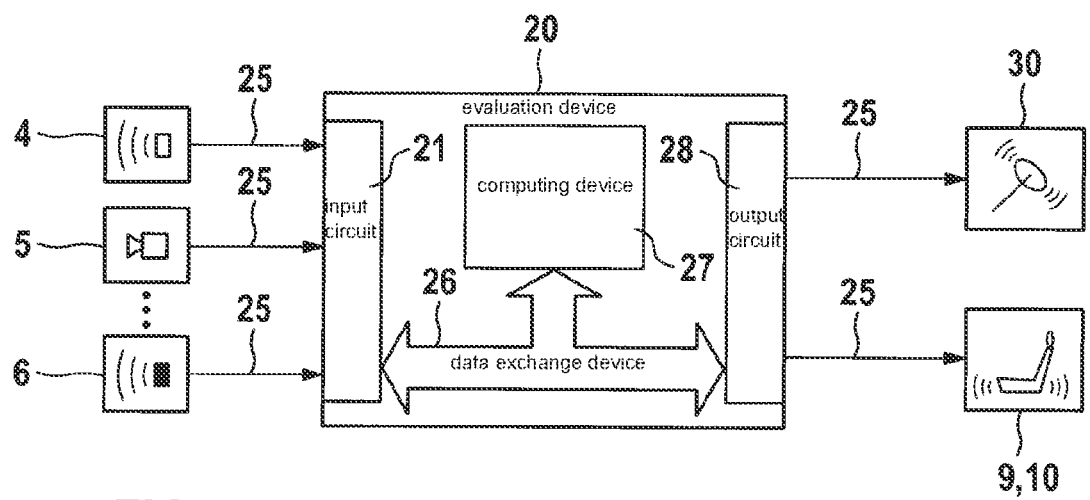
FIG. 2 shows a schematic block diagram of one specific example embodiment of the device according to the present invention.

A schematic block diagram is illustrated in FIG. 2. This block diagram shows an evaluation device 20 that includes an input circuit 21. Input signals 25 may be supplied to evaluation device 20 with the aid of input circuit 21. These input signals 25 originate, among other sources, from surroundings sensors 4, 5, 6, which may be designed as radar sensors, video sensors, LIDAR sensors, or ultrasonic sensors, for example. These surroundings sensors are mounted at the front end of the vehicle, at the rear end of the vehicle, and optionally at the sides of the vehicle, and may monitor the entire vehicle surroundings. Identical spatial areas are advantageously monitored by different types of surroundings sensors, so that a plausibility check and redundancy of the object detection are ensured. Surroundings sensors 4, 5, 6 may have their own control unit, for example, in which object detections and signal processing take place, and which supply object lists as input signals 25 to evaluation device 20. Alternatively or also in combination, it is possible for raw sensor signals to be supplied as input signals 25 to evaluation device 20, and for the evaluation of the raw signals to take place in evaluation device 20.

Input signals 25 supplied to input circuit 21 are supplied, via a data exchange device 26 that may be designed as a bus system by way of example, to a computing device 27 in which the method according to the present invention runs as software, for example, and ascertains a surroundings model 37 from the input signals, ascertains relative positions of detected objects 3 or azimuthal directions of other objects 3 from surroundings model 37, and supplies these as output signals to an output circuit 28 via data exchange device 26.

Output signals 29 are output by evaluation device 20 to downstream actuators 9, 10, 30 with the aid of output circuit 28. Output signals 29 are output, for example, to vibration actuators 30 that are installed at the steering wheel of host vehicle 2. It is thus possible to set the steering wheel or partial areas of the steering wheel in vibration and communicate to the driver a direction and a surroundings situation with the aid of a vibration frequency, a vibration pattern, and the steering wheel section that is set in vibration, so that the driver is intuitively informed of the surroundings situation. Alternatively or additionally, an output signal 29 may be output to seat actuators 9, 10, these seat actuators being made up of multiple vibration actuators, and via their individual activation with the aid of vibration patterns and vibration frequencies, the driver being informable of the surroundings situation.

Figure 3:
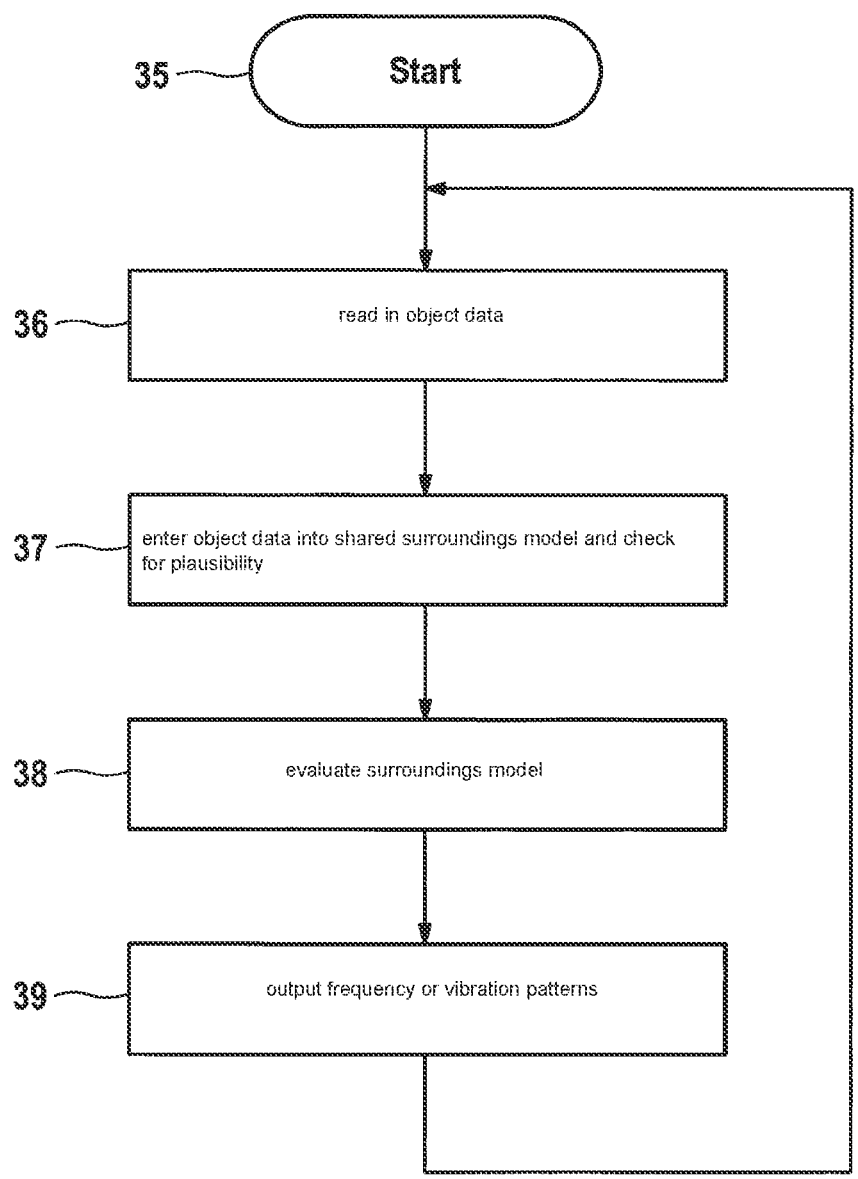
FIG. 3 shows a schematic flowchart for explaining the method according to an example embodiment of the present invention.

A schematic block diagram of the method according to the present invention is illustrated in FIG. 3. The block diagram begins in step 35 by starting the method, for example upon activation of the ignition of host vehicle 2 or upon activation of a specific driver assistance function that is integrated into vehicle 2. Object data from surroundings sensors 4, 5, 6 or from local control units of these local surroundings sensor systems 4, 5, 6 are read in in subsequent processing step 36. Objects, object positions, and their azimuthal directions with respect to host vehicle 2 are ascertained in subsequent step 37. When different surroundings sensor systems are used, for example radar and ultrasound or radar and video or video and LIDAR or some other combination, a sensor data fusion is additionally possible in this step 36, in which the object data of different types of sensors are entered into a shared surroundings model 37 and the objects are checked for plausibility. The surroundings model of step 37 is evaluated in subsequent step 38, and ascertains whether a specific surroundings situation, in particular a specific driving situation of host vehicle 2, together with other objects 3 is present. It is ascertained, for example, whether a newly recognized object 3 has been detected, whether another object 3 is passing or will soon pass host vehicle 2, whether host vehicle 2 is passing or will soon pass another object, a hazardous approach toward another object 3 by host vehicle 2 is present, or some other surroundings situation is present in which the driver is to be informed of other objects 3 in the vehicle surroundings. Based on the recognition of such surroundings situations, specific frequency patterns may be associated with the situations, or specific vibration patterns may be associated and output signals 29 generated, which are output by evaluation device 20 to downstream actuators 9, 10, 30 in subsequent step 39. A single vibration actuator may be activated or multiple, in particular adjacent, vibration actuators may be activated in order to communicate a piece of direction information to the driver. In addition, the vibration actuators may be controlled with regard to a vibration pattern or activated using a different vibration frequency, so that the driver may also be intuitively informed of the specific surroundings situation as well as its criticality with regard to the host traffic situation. After output signals 29 are output to downstream actuators 9, 10, 30, the method according to the present invention is continued with step 36 by running through steps 36 through 39 once again, and other vibration actuators are to be activated with different frequencies and/or different patterns, based on the change in the meantime of surroundings model 37 and the associated change in the surroundings situation.

What is claimed is:

1. A device for warning a driver of a vehicle, the vehicle including multiple surroundings sensors that detect objects in a vehicle surroundings, comprising:
   an evaluation device to create a surroundings model from object detections by the multiple surroundings sensors; and
   an actuator system to inform the driver of recognized objects of the surroundings model, wherein the actuator system for informing the driver contains a piece of spatial warning information and haptically informs the driver of a position of at least one of the recognized objects;
   wherein the multiple surroundings sensors include: at least one radar sensor, and/or at least one ultrasonic sensor, and/or at least one LIDAR sensor, and/or at least one video sensor,
   wherein the multiple surroundings sensors further include a surroundings model made up of data from a data cloud that are received via a car-to-X interface in the vehicle, and further include: (i) one or multiple surroundings sensor(s) of other vehicles, whose data are received via a car-to-X interface in the vehicle, and/or (ii) one or multiple stationary surroundings sensor(s) that are part of traffic infrastructure and whose data are received via a car-to-X interface in the vehicle,
   wherein a relative position of another vehicle with respect to the vehicle and/or an azimuthal direction of the another vehicle with respect to a vehicle longitudinal axis of the vehicle is ascertained, and signals are generated to haptically inform and/or warn the driver, and
   wherein the actuator system includes a plurality of vibration actuators installed in a spatial arrangement, including in a driver seat, so that a warning direction is formed from a spatial activation of the vibration actuators so as to haptically inform and/or warn the driver of the warning direction.

2. The device as recited in claim 1, wherein the evaluation device ascertains from the surroundings model relative positions and/or spatial directions of the detected objects with respect to the vehicle.

3. The device as recited in claim 1, wherein the actuator system, for informing the driver, includes a plurality of vibration actuators in a seat of the driver and/or in a steering wheel and/or in an accelerator pedal and/or in a brake pedal and/or in an armrest and/or in a headrest of the set of the driver.

4. The device as recited in claim 3, wherein activation of the plurality of vibration actuators in the seat of the driver and/or in the steering wheel and/or in the accelerator pedal and/or in the brake pedal and/or in the armrest and/or in the headrest of the seat of the driver takes place so that, due to the activated actuators, a vibration of the seat or of the steering wheel or in the accelerator pedal or in the brake pedal or in the armrest or in the headrest of the driver's seat is generated which haptically informs the driver of the direction, corresponding to the spatial position of the at least one of the recognized objects.

5. A method for warning a driver of a vehicle, the method comprising:
   detecting objects in surroundings of the vehicle using multiple surroundings sensors;
   creating a surroundings model from the object detections using an evaluation device;
   generating actuator signals that inform the driver of recognized objects as a function of the recognized objects of the surroundings model;
   activating an actuator system to provide the driver with a piece of haptic information about a spatial direction, wherein the actuator system is activated by the actuator signals so that the driver is haptically informed of a position of at least one of the recognized objects;
   wherein the multiple surroundings sensors include: at least one radar sensor, and/or at least one ultrasonic sensor, and/or at least one LIDAR sensor, and/or at least one video sensor,
   wherein the multiple surroundings sensors further include a surroundings model made up of data from a data cloud that are received via a car-to-X interface in the vehicle, and further include: (i) one or multiple surroundings sensor(s) of other vehicles, whose data are received via a car-to-X interface in the vehicle, and/or (ii) one or multiple stationary surroundings sensor(s) that are part of traffic infrastructure and whose data are received via a car-to-X interface in the vehicle,
   wherein a relative position of another vehicle with respect to the vehicle and/or an azimuthal direction of the another vehicle with respect to a vehicle longitudinal axis of the vehicle is ascertained, and signals are generated to haptically inform and/or warn the driver, and
   wherein the actuator system includes a plurality of vibration actuators installed in a spatial arrangement, including in a driver seat, so that a warning direction is formed from a spatial activation of the vibration actuators so as to haptically inform and/or warn the driver of the warning direction.

6. The method as recited in claim 5, wherein the surroundings model is ascertained from output signals of the surroundings sensors, and a relative position and/or the spatial direction of the detected objects with respect to the vehicle is ascertained.

7. The method as recited in claim 5, wherein the actuator signals for informing the driver are configured so that a plurality of vibration actuators in a seat of the driver seat and/or in a steering wheel and/or in an accelerator pedal and/or in a brake pedal and/or in an armrest of the seat of the driver and/or in a headrest of the seat of the driver are: (i) individually activatable or deactivatable, and/or (ii) variably activatable in their intensity and/or frequency.

8. The method as recited in claim 7, wherein the activation of the plurality of vibration actuators takes place so that a vibration of the seat and/or of the steering wheel and/or in the accelerator pedal and/or in the brake pedal and/or in an armrest of the seat of the driver and/or in the headrest of the seat of the driver is generated which haptically informs the driver of a direction, corresponding to the spatial position of the at least one recognized object.

9. The method as recited in claim 7, wherein the information to the driver concerning the direction of the objects is output to the vibration actuators when:
   objects are newly recognized, and/or
   it is recognized that a moving object in the vehicle surroundings is passing the host vehicle, and/or
   it is recognized that the moving object in the vehicle surroundings is being passed by the host vehicle, and/or
   it is recognized that there is a hazard to the vehicle due to the moving object in the vehicle surroundings, and/or
   it is recognized that there is a critical approach by a moving object toward the vehicle.

10. The method as recited in claim 5, wherein for different surroundings situations, actuators of the actuator system are activated with different frequencies and/or using different vibration patterns.

* * * * *